United States Patent [19]

Oda et al.

[11] Patent Number: 4,551,220
[45] Date of Patent: Nov. 5, 1985

[54] GAS DIFFUSION ELECTRODE MATERIAL

[75] Inventors: Yoshio Oda; Takeshi Morimoto, both of Yokohama, Japan

[73] Assignee: Asahi Glass Company, Ltd., Tokyo, Japan

[21] Appl. No.: 517,957

[22] Filed: Jul. 28, 1983

[30] Foreign Application Priority Data

Aug. 3, 1982 [JP] Japan .................. 57-134768
Aug. 3, 1982 [JP] Japan .................. 57-134769

[51] Int. Cl.$^4$ ............................................. C25B 11/12
[52] U.S. Cl. .................................... 204/294; 429/42
[58] Field of Search ......................... 204/294; 429/42

[56] References Cited

U.S. PATENT DOCUMENTS

| | | | |
|---|---|---|---|
| 3,196,050 | 7/1969 | Thompson | 204/294 |
| 4,046,654 | 9/1977 | Cole | 204/294 |
| 4,054,687 | 10/1977 | Kunz | 429/42 |
| 4,120,774 | 10/1978 | Hart | 204/294 |
| 4,236,993 | 12/1980 | Muller | 204/294 |
| 4,287,032 | 9/1981 | Pellegri | 204/294 |
| 4,354,958 | 10/1982 | Solomon | 204/294 |
| 4,364,805 | 12/1982 | Rogers | 204/294 |

Primary Examiner—John F. Niebling
Attorney, Agent, or Firm—Oblon, Fisher, Spivak, McClelland & Maier

[57] ABSTRACT

A gas diffusion electrode material which comprises a continuously micro-porous electrically insulating material and at least partially graphitized carbon black powder uniformly incorporated in the insulating material.

7 Claims, 1 Drawing Figure

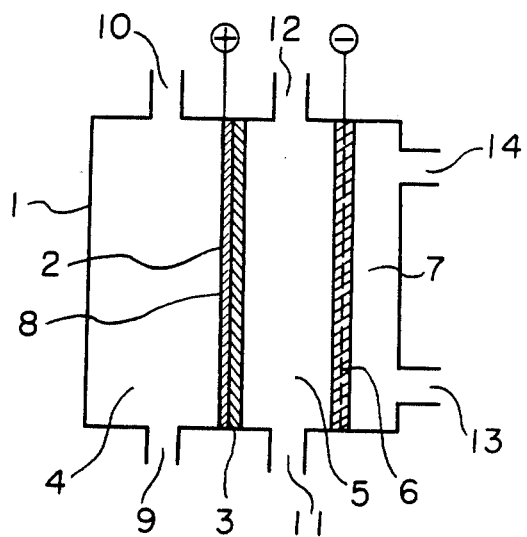

GAS DIFFUSION ELECTRODE MATERIAL

The present invention relates to a gas diffusion electrode material, and more particularly to a gas diffusion electrode material having superior durability and composed of a specific porous material in which specific carbon black powder is uniformly incorporated.

Heretofore, gas diffusion electrodes have been proposed to be used as a fuel electrode and an oxygen electrode for a hydrogen-oxygen fuel cell, as an air electrode for an air-zinc cell, as electrodes for a galvanic-type gas sensor, or as gas permeable cathodes for an alkali metal electrolytic cell.

Various constructions and processes for their preparation have been proposed. For instance, Japanese Unexamined Patent Publications No. 121202/1981 and No. 30270/1982 disclose a gas diffusion electrode material comprising a continuously micro-porous electrically insulating material (hereinafter sometimes referred to simply as a "porous material") and powder of a conductive material uniformly distributed therein.

It is common to use a polytetrafluoroethylene (hereinafter referred to simply as "PTFE") as the porous material and carbon black powder as the powder of a conductive material. Further, as porous PTFE products, those prepared by the processes disclosed in Japanese Examined Patent Publications No. 13560/1967, No. 14178/1967, No. 44664/1973 and No. 18991/1976 are said to be suitable. Namely, firstly non-sintered PTFE powder is mixed with a liquid lubricant, and the mixture is formed into a desired shape by e.g. extrusion or rolling. After removing the liquid lubricant from the formed products by extraction or heat-evaporation, or without such removal, the formed product is at least monoaxially stretched. The stretched product is heated at a temperature of at least the sintering temperature of PTFE of least about 327° C. under a thermal shrinkage-preventive condition to fix the stretched structure, whereby a porous PTFE product having improved strength is obtainable. Of course, the fixing treatment may be conducted under a condition where partial shrinkage may take place. Such a porous PTFE product has a micro-porous structure formed by a numerous fine nodes and fine fibers extending from the nodes and three dimensionally connecting the nodes to one another. The diameter and the length of the fine fibers and the size and the number of the nodes can be increased as the case requires. Therefore, the porous PTFE product has excellent properties suitable for use as the porous material for a gas diffusion electrode material.

The present inventors have conducted various studies on the gas diffusion electrode material comprising the above-mentioned porous material and the powder of the conductive material, and as a result have made the following interesting discoveries. Namely, when the conventional conductive carbon black powder is used, there is certain difficulties in securing the durability of the electrode material i.e. in maintaining the desired property of the electrode material constantly for a long period of time. For instance, when used for the purpose of reducing the electrolytic cell voltage as a gas permeable cathode for an alkali metal electrolytic cell, the electrode prepared by uniformly incorporating the conventional highly conductive carbon black powder into a porous PTFE product, tends to lose its effectiveness for reducing the cell voltage in a short period of time. As a result of an extensive study on the cause of this phenomenon, the present inventors have found that when the conventional carbon black (i.e. non-graphitized carbon) is used, it is oxidized during its use, and the carbon black is gradually worn out, thus losing its effectiveness for reducing the cell voltage. It has now been found that such conventional difficulties can be solved by graphitizing at least partially the conventional carbon black particles. The present invention has been accomplished based on these discoveries.

Thus, the present invention provides a gas diffusion electrode material which comprises a continuously micro-porous electrically insulating material and at least partially graphitized carbon black powder uniformly incorporated in the insulating material.

Now, the present invention will be described in detail with reference to the preferred embodiments.

In the accompanying drawing, FIG. 1 is a diagrammatic illustration of an embodiment wherein the electrode material of the present invention is used as an oxygen-reduction cathode in an alkali metal chloride electrolytic cell.

In the present invention, as the porous material, there may be employed various porous products made of an insulating material. Usually, however, a porous material made of polytetrafluoroethylene is used as the most suitable material. As the porous PTFE material, a porous material with fine pores formed by the stretching as mentioned above and having a micro structure comprising fine fibers and fine nodes connected to one another by the fine fibers, is most suitable. Such a specific porous PTFE material is constituted by a three dimensional net-work structure of the fine nodes and the fine fibers and has a high porosity, whereby it has good gas permeability in its entirety. Further, as a numerous fine fibers are three dimensionally ramified in the spaces between the fine nodes, the pore or pore size distribution is consistent throughout the entire porous material. Furthermore, by virtue of the strong water repellency intrinsic to PTFE, the entire structure shows uniform and adequate water repellency and anti-water permeability. Moreover, with such a specific micro structure, it may be formed to have a thin wall thickness and yet have superior mechanical strength. It may be formed not only into a sheet product but also into various other shaped products such as a tubular product, a cylindrical product or a rod-like product. Further, it may be formed into a large size product, and has an advantage that it has a small specific gravity.

Thus, in the present invention, a specific carbon black powder is uniformly incorporated in the porous material. Various methods may be employed for such incorporation. For instance, a dispersion of carbon black powder may be impregnated into the porous voids in the porous material, followed by drying, whereby the carbon black powder will be retained in the porous voids. However, in the present invention, it is preferred to uniformly incorporate the carbon black powder into the main bodies of the porous material. When the above-mentioned specific porous PTFE material is used, it is particularly preferred to employ an embodiment wherein the specific carbon black powder is incorporated into the fine nodes, and such nodes are partially in contact or connected with one another. According to such a manner of incorporation, the entire structure has good electric conductivity and provides an advantage also from the point of view of the maintenance of the desired properties. Further, the fine fibers do not substantially contain the carbon black powder, whereby the fine fiber portions maintain the strong water repellency intrinsic to PTFE.

In a particularly preferred embodiment of the gas diffusion electrode material of the present invention, the porous PTFE material is composed of a numerous fine nodes of PTFE and fine fibers of PTFE extending from the nodes and three dimensionally connecting the nodes to one another, the nodes being partially in contact or connected with one another, and the specific carbon black powder is incorporated in the above-mentioned fine nodes. Such an electrode material may be readily and advantageously be prepared in accordance with the following procedural steps (1) to (4) by employing the methods for the preparation of a porous PTFE product having a special micro porous structure as disclosed in the above-mentioned Patent Publications.

(1) A paste-like mixture is prepared by mixing fine PTFE powder, the specific carbon black powder and a liquid lubricant, as essential components.

(2) The mixture thereby obtained is formed into e.g. a sheet by compression, extrusion, rolling or a combination of these means.

(3) The liquid lubricant is removed from the formed product by a suitable means such as heating or extraction, and then the formed product is treated by stretching at least in one direction.

(4) This stretch-treated product (i.e. a non-sintered product) may be used as a final product, but, if required, the stretch-treated product may further be subjected to rolling or compression treatment by means of rolls or pressing plates, or to heat treatment (i.e. complete sintering or incomplete sintering), or it may be subjected to a proper combination of these treatments, to obtain a final product.

In the preparation of the above-mentioned paste-like mixture, it is important that the carbon black powder is at least partially graphitized. The graphitization may be conducted under the condition where the carbon black powder as the starting material is maintained at a temperature of from 1,200° to 2,500° C. for from 5 to 60 minutes. The degree of graphitization may be the one attained under the above-mentioned condition. More specifically, in the carbon black graphitized under the above-mentioned condition, the distance between the layers composed of carbon atom hexagon, as measured by the powder X-ray analysis, is within a range of from 10 to 90% of the difference between the distance of graphite layers and the distance of the carbon black layers (i.e. the graphitization ratio by the X-ray analysis is from 10 to 90%). (The layered structure is described in Kirk-Othmer Encyclopedia of Chemical Technology, Vol. 4 (1978), p.633). In the present invention, it is, of course, possible to use the above-mentioned specific carbon black powder together with other various conductive powders, such as carbon black powder having a relatively large specific surface area, graphite powder, active carbon powder, carbon fiber, metal powder (such as platinum, gold, tantalum, titanium, or nickel powder), metal oxide powder, Raney metal powder. The specific carbon black powder and other conductive powders should preferably have a particle size of at most 1 $\mu$m, more preferably at most 0.8 $\mu$m.

The amount of the specific carbon black powder to be incorporated is usually from 7 to 90% by weight, preferably from 15 to 80% by weight, based on the total weight of the material. If the amount is less than 7% by weight, the electric conductivity tends to be small. On the other hand, if the amount exceeds 90% by weight, the water repellency tends to be insufficient.

As the liquid lubricants, there may be used liquid hydrocarbon such as petroleum, solvent naphtha and white oil. The amount of the liquid lubricant is selected within a range of from 20 to 300 parts by weight per 100 parts by weight of the total weight of the fine PTFE powder and the specific carbon black powder. The paste-like mixture composed of the fine PTFE powder, the carbon black powder and the liquid lubricant as the basic components, may be prepared in various orders for incorporation and by various mixing means. Further, if desired, a water repellency-increasing agent such as wax or graphite powder, a reinforcing agent such as fluorinated rubber or a coloring pigment may optionally be incorporated. Moreover, depending upon the particular purpose of the electrode material, various catalytic substances as mentioned below, may be incorporated to obtain an electrode material having a catalytic activity.

By the stretching treatment mentioned in the above item (3), a gas diffusion electrode material composed of a porous PTFE product having a special micro structure is obtainable in which the specific carbon black powder is incorporated in the fine nodes. Various properties of the porous structure may optionally be adjusted within wide ranges by controlling the conditions such as the stretching direction, the stretching ratio, the stretching temperature and the stretching rate per unit time. It is usually desirable to form a porous structure having a porosity of from 40 to 95%, a maximum pore size of from 0.1 to 3 $\mu$m and an air permeability coefficient of from $10^{-5}$ to $10^{-1}$ mol/cm$^2$.mm.cmHg. It is particularly preferred to choose the physical properties so that the porosity is from 50 to 90%, the maximum pore size is from 0.1 to 1 $\mu$m and the air permeability coefficient is $10^{-4}$ to $10^{-1}$ mol/cm$^2$.mm.cmHg, whereby good water permeability resistance and adequate gas diffusion can be expected. The gas diffusion electrode material usually has a thickness of from 20 to 500 $\mu$m, preferably from 30 to 300 $\mu$m.

In the present invention, the non-sintered material may be used as a gas diffusion electrode material by itself. However, it may further be subjected to heat treatment as mentioned in the above item (4) for complete sintering (i.e. sintering at a temperature of at least the melting point of PTFE of 327° C.) or for incomplete sintering (i.e. sintering at a temperature of not higher than 327° C.) to obtain a sintered final product. Further, for the purpose of preventing the flowing out of the carbon black powder, other conductive powders and the after-mentioned catalyst uniformly incorporated in the porous material, a filler such as a dispersion of e.g. PTFE or FEP, may optionally be impregnated prior to the sintering treatment.

In order to impart a catalytic function, the following various methods may be employed.

(a) As the carbon black powder or other conductive powders, those having a catalytic substance such as platinum black previously supported thereon, are used.

(b) A catalyst precursor is incorporated in the PTFE powder, and it is then precipitated in the form of a catalytic substance by a chemical and/or physical mean such as heating, hydrolysis or reduction. The powder in which the catalytic substance is supported, is used as the PTFE powder.

(c) A paste-like mixture obtained by incorporating a catalytic substance into the PTFE powder and carbon black powder, is used.

(d) A dispersion of a catalytic substance is impregnated into a preliminarily prepared porous electrode material, followed by drying.

(e) A catalyst precursor is incorporated into a previously prepared porous electrode material, and it is then precipitated as a catalytic substance by a chemical and/or physical mean such as heating, hydrolysis or reduction.

(f) A gas-permeable film or sheet containing a catalytic substance is laminated on the surface of the porous electrode material by press-bonding or heat-bonding.

When a catalyst is supported on carbon black powder, it is preferred that the carbon black is previously graphitized and then subjected to etching treatment. When a platinum group metal such as platinum is supported, as a catalyst, on carbon black particles, the platinum group metal is presumably supported in the etched portions (such as grooves or recesses) on the surface of the carbon black particles, whereby during the subsequent process, the association or flocculation of the platinum group metal hardly takes place, and accordingly the desired property can be maintained for a long period of time.

As a specific mean for the etching treatment, oxidation treatment is preferably used. As the oxidation treatment, it is preferred to employ heating treatment in an oxygen atmosphere (including air) or treatment with an oxidizing agent such as nitric acid, sulfuric acid or a permanganate. A preferred degree of the etching treatment is such that the weight reduction of the carbon black due to the etching treatment is from 5 to 40%.

The gas diffusion electrode material of the present invention may be used by itself or in combination with a current collector and a porous membrane in an integral form as a gas diffusion electrode for various purposes. The superior effect to the present invention is obtainable particularly when the gas diffusion electrode material is used as an oxygen reducing cathode in an alkali metal chloride electroytic cell for the purpose of reducing the electrolytic cell voltage. As illustrated in FIG. 1 of the accompanying drawing, for the production of an alkali metal hydroxide by the electrolysis of an aqueous alkali metal chloride solution by using such a cathode, an electrolytic cell 1 is divided in a conventional manner by a cation exchange membrane 3 to form an anode compartment 4 provided with an anode 2 and a cathode compartment 5, and in the cathode compartment 5, an oxygen reduction cathode 6 is provided to form an oxygen-containing gas (i.e. air) supply chamber 7. Reference numeral 9 designates an inlet for aqueous alkali metal chloride solution such as a sodium chloride solution to be electrolyized, and reference numeral 10 designates an outlet for the aqueous solution and formed chlorine. Reference numeral 11 designates an inlet to supply water into the cathode compartment, and reference numeral 12 designates an outlet for the formed alkali metal hydroxide and hydrogen. Reference numerals 13 and 14 designate an inlet and outlet for the oxygen-containing gas, respectively. In FIG. 1, the anode 2 is provided in contact with a porous layer 8 formed on the surface of the ion exchange membrane 3.

As the anode to be used in the present invention, there may optionally be used an anode prepared by coating an oxide of a metal such as ruthenium or rhodium on the surface of the substrate made of titianium or tantalum, a so-called dimentionally stable metal anode such as a platinum anode, or a graphite anode. However, among them it is particularly preferred to employ the above-mentioned metal anode, since it is thereby possible to lower the electrolytic cell voltage as compared with the case where other anodes are employed.

As the ion-exchange membrane to be used in the present invention, those which comprise a polymer containing cation-exchange groups such as carboxyl groups, sulfonic acid groups, phosphoric acid groups, phenolic hydroxy groups, etc. are used. As such a polymer, fluorine-containing polymers are particularly preferable. As the fluorine-containing polymers having ion-exchange groups, there are suitably used copolymers of vinyl monomer (e.g. tetrafluoroethylene, chlorotrifluoroethylene, or the like and perfluorovinyl monomer containing a reactive group capable of being converted to an iron-exchange group such as sulfonic acid, carboxylic acid, phosphoric acid, or the like, or perfluorovinyl monomer containing an ion-exchange group such as sulfonic acid carboxylic acid or phosphoric acid.

In addition, there can be used those which comprises a trifluorostyrene membranous polymer having introduced thereinto ion-exchange groups such as sulfonic acid groups and those which are prepared by introducing sulfonic acid groups into a styrenedivinylbenzene copolymer.

Of these, polymers prepared by using monomers capable of forming the following polymerization units (i) and (ii) are particularly preferable because they enable to obtain caustic alkali with high purity and considerably high current efficiency:

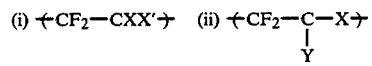

wherein X represents a fluorine atom, a chlorine atom, a hydrogen atom or $-CF_3$, X' represents X or $CF_3(CF_2)_{\overline{m}}$ (wherein m represents 1 to 5), and Y is selected from those of the formulae:

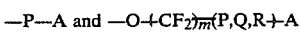

(wherein P represents $+CF_2)_{\overline{a}}(CXX')_{\overline{b}}(CF_2)_{\overline{c}}$, Q represents $+CF_2-O-CXX')_{\overline{d}}$, R represents $+CXX'-O-CF_2)_{\overline{e}}$, (P, Q, R) represents at least one of P, Q and R which are aligned in an arbitrary order, X and X' are the same as defined above, n=0 to 1, a, b, c, d and e are 0 to 6. A represents —COOH or a functional group capable of being converted to —COOH by hydrolysis or neutralization [e.g. —CN, —COF, —COOR$_1$, —COOM, —CONR$_2$R$_3$, etc. (wherein R$_1$ represents an alkyl group containg 1 to 10 carbon atoms, M represents an alkali metal or a quaternary ammonium group, and R$_2$ and R$_3$ each represents a hydrogen atom or an alkyl group containing 1 to 10 carbon atoms)].

As the preferable examples of Y described above, there are illustrated, for example, the following ones wherein A is bound to a fluorine-containing carbon atom:

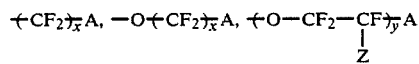

-continued

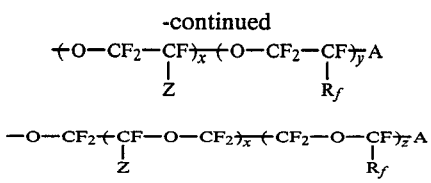

wherein x, y, and z each represents 1 to 10, Z and $R_f$ each represents —F or a perfluoroalkyl group containing 1 to 10 carbon atoms, and A is the same as defined above.

Where a fluorine-containing cation-exchange membrane comprising such copolymer and having an intramembranous carboxylic acid group density of 0.5 to 2.0 meq per g of the dry resin is used, a current efficiency as high as 90% or more can be attained even when concentration of caustic soda becomes 40% or more. Intramembranous carboxylic acid density of 0.9 to 1.8 meq per g of the dry resin is particularly preferable because such density assures to obtain caustic soda with as high a concentration as described above and with high current efficiency over a long period of time. For attaining the above-described ion-exchange capacity, the copolymers comprising the above-described polymerization units (i) and (ii) preferably contains 1 to 40 mol%, particularly preferably 3 to 25 mol% of (ii).

Preferable ion-exchange membranes to be used in the present invention are constituted by a non-crosslinkable copolymer obtained by the copolymerization of a fluorine-containing olefin monomer as described above with a polymerizable monomer having a carboxylic acid group or a functional group capable of being converted to a carboxylic acid group. The molecular weight of the copolymer ranges preferably from about 100,000 to 2,000,000, particularly preferably from 150,000 to 1,000,000. In preparing such a copolymer, one or more monomers per each monomer unit are used, a third monomer optionally being copolymerized to modify the membrane. For example, the combined use of $CF_2=CFOR_f$ (wherein $R_f$ represents a perfluoroalkyl group containing 1 to 10 carbon atoms) can impart flexibility to a resulting membrane, and the combined use of divinyl monomer such as $CF_2=CF-CF=CF_2$ or $CF_2=CFO(CF_2)_{1-3}CF=CF_2$ can crosslink the copolymer to thereby impart mechanical strength to the membrane.

Copolymerization between the florinated olefin monomer, the polymerizable monomer having a carboxylic acid group or a functional group capable of being converted to carboxylic acid group and, if necessary, the third monomer can be conducted in any conventionally known process. That is, the copolymerization can be conducted by catalytic polymerization, thermal polymerization, radiation polymerization, etc. using, if necessary, a solvent such as halogenated hydrocarbon. Processes to be employed for filming the thus obtained copolymer into an ion-exchange membrane are not particularly limited, and known ones such as press-molding, roll-molding, extrusion molding, solution casting, dispersion molding, powder molding, etc. may properly be employed.

The thickness of the thus obtained membrane is suitably controlled to 20 to 500 μm, particularly preferably 50 to 400 μm.

Where the copolymer contains functional groups capable of being converted to carboxylic acid groups and does not contain carboxylic acid groups, the functional groups are converted to carboxylic acid groups by a proper corresponding treatment before or after, preferably after, the filming step. For example, where the functional groups are —CN, —COF, —COOR$_1$, —COOM, or —CONR$_2$R$_3$ (wherein M and R$_1$–R$_3$ are the same as defined herein-before), they are converted to carboxylic acid groups by hydrolysis or neutralization using an acid or alkali alcohol solution, and, when the functional groups are double bonds, they are reacted with —COF$_2$ to convert to carboxylic acid groups.

Further, the cation-exchange membrane to be used in the present invention may, if necessary, be mixed with an olefin polymer such as polyethylene or polypropylene, preferably fluorine-containing polymer such as polytetrafluoroethylene or ethylene-tetrafluoroethylene copolymer before being molded. It is also possible to reinforce the membrane by using texture (e.g. cloth, net, etc.), non-woven fabric, porous film, or the like comprising these copolymers, or metallic wire, net, or porous body as a support.

As the alkali metal chloride to be electrolyzed, sodium-chloride is most common. However, other alkali metal chlorides such as potaccium chloride and lithium chloride may likewise be electrolyzed.

Now, the present invention will be described in further detail with reference to Examples.

EXAMPLE 1

Carbon black (VULCAN XC-72R, trade name, manufactured by Cabbot Company, U.S.A., specific surface area: 254 m²/g) was subjected to heat treatment at 2,000° C. for 30 minutes to obtain graphitized carbon black. The graphitized carbon black thus obtained had a specific surface area of 72 m²/g. It had a graphitization ratio of 20% as measured by the powder X-ray analysis.

Then, a mixture of 55% by weight of PTFE powder and 45% by weight of the above-mentioned carbon black was prepared by a agglomeration method. A liquid lubricant (solvent naphtha) was incorporated into the mixture to obtain a paste-like mixture. This mixture was compressed and extruded by a ram from a fish tail to obtain a sheet material having a thickness of 1.2 mm. Then, the sheet material was rolled in a direction perpendicular to the extrusion direction to obtain a thin sheet having a thickness of 0.35 mm. This sheet was pre-heated to a temperature of 310° C. and monoaxially stretched by 1.9 times, and then while fixing the length of the stretched sheet in the stretching direction, the sheet was heated to 360° C. to effect complete sintering treatment, whereby a porous PTFE membrane containing partially graphitized carbon black was obtained. The physical properties of this membrane were as follows:

| | |
|---|---|
| Thickness: | 160 μm |
| Porosity: | 70% |
| Maximum pore diameter: | 0.6 μm |

The membrane was immersed in a mixed solution of 10 cc of 10% chloroplatinic acid aqueous solution and 40 cc of isopropanol, and after fixing the periphery, the membrane was dried. It was further treated in a hydrogen stream at 200° C. to reduce the chloroplatinic acid to platinum, whereby a porous PTFE membrane containing carbon black with 0.5 mg/cm² of platinum deposited thereon was obtained. Further, the membrane was heat-pressed to a silver-plated nickel expanded mesh (breadthwise pitch: 1 mm, lengthwise pitch: 2 mm, thickness: 0.1 mm) coated with a mixture of carbon black and FEP (mixing ratio of 3:2) to obtain an electrode.

By using this electrode as a cathode, an electrolytic cell as shown in FIG. 1 was prepared wherein a membrane and an anode were provided in contact with each other, and the distance between the membrane and the cathode was maintained to be 5 mm. As the anode, a metal anode prepared by coating a solid solution of ruthenium oxide and iridium oxide on the surface of a titanium expanded metal was used. As the membrane, a fluorine-containing cation exchange membrane obtained by hydrolyzing a membrane-like material (thickness: 280 μm, ion-exchange capacity: 1.44 meq/g dry resin) made of a copolymer of $C_2F_4$ with $CF_2=CFO(CF_2)_3COOCH_3$ and embedding 1 mg/cm² of a porous layer of zirconium oxide on the anode side surface, was used. An aqueous solution of 5N sodium chloride was electrolyzed at a current of 4 A (current density: 20 A/dm²) while supplying 1 l/min. of air freed from carbon dioxide gas, to the gas supply chamber. The electrolysis was conducted by adjusting the amount of the aqueous sodium chloride solution supplied to the anode compartment and the amount of the water supplied to the cathode compartment so that the sodium chloride concentration in the anode compartment was maintained at 3.5N and the sodium hydroxide concentration in the cathode compartment was maintained at 35% by weight. The initial cell voltage was 2.18 V and the increase of the cell voltage after the continous operation of the electrolysis for 3,000 hours was 0.08 V. Further, the current efficiency for the production of sodium hydroxide during this period was 93.5%.

EXAMPLE 2

A porous PTFE membrane containing a silver-supported carbon black having the following physical properties was obtained in the same manner as in Example 1 by using the same carbon black as used in Example 1 except that carbon black supporting 50% by weight of silver was used instead of the platinum-supported carbon black in Example 1.

| Thickness: | 140 μm |
| Porosity: | 68% |
| Maximum pore diameter: | 0.55 μm |

Without depositing platinum to the membrane, an electrode was prepared in the same manner as in Example 1, and the electrolysis was conducted in the same manner as in Example 1, whereby the following results were obtained.

| Cell voltage: | 2.31V |
| Current efficiency: | 93.5% |

Further, the electrolysis was conducted for an extended period of time of 3,000 hours, whereby the increase of the cell voltage during this period was 0.05 V over the initial cell voltage.

COMPARATIVE EXAMPLE 1

A porous PTFE membrane containing carbon black and having the following physical properties was prepared in the same manner as in Example 1 except that the same carbon black (no graphitization) as used in Example 1, was used by itself without subjecting it to heat treatment.

| Thickness: | 180 μm |
| Porosity: | 85% |
| Maximum pore diameter: | 0.8 μm |

An electrode was prepared by using the above membrane in the same manner as in Example 1, and the electrolysis was conducted in the same manner as in Example 1, whereby the initial cell voltage was 2.15 V, and the increase of the cell voltage after the continuous hydrolysis for 3,000 hours was 0.37 V.

COMPARATIVE EXAMPLE 2

A porous PTFE membrane containing silver-supported carbon black and having the following physical properties was prepared in the same manner as in Example 1 except that the silver-supported carbon black was prepared in accordance with Example 2 from the carbon black as used in Comparative Example 1 and used.

| Thickness: | 160 μm |
| Porosity: | 79% |
| Maximum pore diameter: | 0.75 μm |

Without depositing platinum on the membrane, an electrode was prepared in the same manner as in Example 1, and the electrolysis was conducted in the same manner as in Example 1, whereby the initial cell voltage was 3.32 V, and the increase of the cell voltage after the continuous electrolysis for 3,000 hours was 0.41 V over the initial cell voltage.

EXAMPLE 3

Carbon black powder (VULCAN XC-72R, trade name, manufactured by Cabbot Company, U.S.A.,) was heated for 30 minutes at 2,000° C. in the same manner as in Example 1, whereby the powder was partially graphitized. The powder is added to an aqueous iron formate solution, and the mixture was stirred and heated to remove water. Then, the mixture was heated under vacuum at 150° C. to decompose iron formate. The powder thereby obtained, contained 0.1% of iron. Then, this powder was heated to 500° C. in a nitrogen stream, then exposed to oxygen gas for 30 seconds for oxidation, and cooled in a nitrogen stream and then stirred. The oxidation operation was repeated until the weight of the powder was reduced by 15%. Then, the powder was washed with a 50% nitric acid solution to remove iron from the powder, then washed with water and dried at 100° C., whereby partially graphitized carbon black having a pit on the surface of the particles was obtained.

Then, a mixture comprising 55% by weight of PTFE powder and 45% by weight of the above-mentioned partially graphitized carbon black having pits on the surface of the particles, was prepared by a flocculation method. A liquid lubricant (solvent naphtha) was incorporated into this mixture to obtain a paste-like mixture. This mixture was compressed and extruded by a ram from a fish tail to obtain a sheet material having a thickness of 1.2 mm. Then, the sheet material was further rolled in a direction perpendicular to the extrusion direction to obtain a thin sheet having a thickness of 0.35 mm. This sheet was monoaxially stretched by 1.6 times under the pre-heated condition at 310° C. While fixing the length of the stretched sheet in the stretching direction, the sheet was heated at 360° C. for complete sintering treatment, whereby a porous PTFE membrane containing carbon black was obtained. The physical properties of this membrane were as follows.

| Thickness: | 180 $\mu$m |
|---|---|
| Porosity: | 75% |
| Maximum pore diameter: | 0.6 $\mu$m |

The membrane was immersed in a mixed solution of 10 cc of a 10% chloroplatinic acid aqueous solution and 40 cc of isopropanol. After fixing the periphery, the membrane was dried and further treated in a hydrogen stream at 200° C. to reduce the chloroplatinic acid to platinum, whereby a porous PTFE membrane containing carbon black with 0.5 mg/cm$^2$ of platinum deposited thereon was obtained. The membrane was heat-pressed at 300° C. to a silver plated nickel expanded mesh (breadthwise pitch: 1 mm, lengthwise pitch: 2 mm, thickness: 0.1 mm) coated with a mixture of carbon black and FEP (mixing ratio of 3:2), whereby an electrode was obtained.

By using this electrode as a cathode, an electrolytic cell as shown in FIG. 1 was prepared wherein a membrane and an anode were provided in contact with each other, and the distance between the membrane and the cathode was maintained to be 5 mm. As the anode, a metal anode prepared by coating a solid solution of ruthenium oxide and iridium oxide on the surface of a titanium expanded metal, was used. As the membrane, a fluorine-containing cation-exchange membrane obtained by hydrolyzing a membrane-like material (thickness: 280 $\mu$m, ion-exchange capacity: 1.44 meq/g dry resin) made of a copolymer of C$_2$F$_4$ with CF$_2$=CFO(CF$_2$)$_3$COOCH$_3$ and having 1 mg/cm$^2$ of a porous layer of zirconium oxide embedded on the anode side surface, was used. An aqueous solution of 5N sodium chloride was electrolyzed at a current of 4 A (current density: 20 A/dm$^2$) while supplying 1 l/min. of air free from carbon dioxide gas, to the gas supply chamber. The electrolysis was conducted by adjusting the amount of the sodium chloride solution supplied to the anode compartment and the amount of water supplied to the cathode compartment so that the sodium chloride concentration in the anode compartment was maintained at 3.5N and the sodium hydroxide concentration in the cathode compartment was maintained at 35% by weight. The initial cell voltage was 2.15 V, and the increase of the cell voltage after the continuous operation of the electrolysis for 3,000 hours was 0.03 V. The current efficiency for the production of sodium hydroxide during this period was 93.5%.

EXAMPLE 4

A porous PTFE membrane containing silver-supported carbon black and having the following physical properties, was prepared in the same manner as in Example 3 except that carbon black supporting 60% by weight of silver was used instead of the carbon black used in Example 3.

| Thickness: | 155 $\mu$m |
|---|---|
| Porosity: | 77% |
| Maximum pore diameter: | 0.7 $\mu$m |

Without depositing platinum to the membrane, an electrode was prepared in the same manner as in Example 3, and the electrolysis was conducted in the same manner as in Example 3, whereby the following results were obtained.

| Cell voltage: | 2.27V |
|---|---|
| Current efficient: | 93.5% |

Further, the electrolysis was conducted for an extended period of 3,000 hours, whereby the increase of the cell voltage during this period was 0.03 V over the initial cell voltage.

We claim:

1. A gas diffusion electrode material which comprises a continuously micro-porous electrically insulating material and partially graphitized carbon black powder uniformly incorporated in the insulating material, said continuously microporous electrically insulating material comprising numerous fine nodes of polytetrafluoroethylene and fine fibers of a polytetrafluoroethylene extending from the nodes and three dimensionally connecting the nodes to one another, the nodes being partially in contact or connected with one another, said partially graphitized carbon black powder being carbon black which has been graphitized to a graphitization ratio of from 10% to 90% by subjecting the carbon black to a treatment at a temperature of from 1,200° C. to 2,500° C. for 5 to 60 minutes.

2. The gas diffusion electrode material according to claim 1, wherein the graphitized carbon black powder is graphitized carbon black subjected to etching treatment.

3. The gas diffusion electrode material according to claim 2, wherein the etching treatment is conducted by oxidation treatment of graphitized carbon black.

4. The gas diffusion electrode material according to claim 3, wherein the oxidation treatment is conducted by heat treatment in an oxygen atmosphere or by treatment with an oxidizing agent comprising nitric acid, sulfuric acid or a permanganate.

5. The gas diffusion electrode material according to claim 1, wherein the continuously micro-porous electrically insulating material is a polytetrafluoroethylene.

6. The gas diffusion electrode material according to claim 1, wherein the graphitized carbon black powder has a particle size of at most 1 $\mu$m.

7. The gas diffusion electrode material according to claim 1, wherein the graphitized carbon black is incorporated in an amount of from 7 to 90% by weight based on the total weight of the continuously microporous electrically insulating material and the graphitized carbon black powder.

* * * * *